United States Patent
Thomas et al.

(10) Patent No.: US 7,032,818 B2
(45) Date of Patent: Apr. 25, 2006

(54) METHOD AND SYSTEM OF SETTING AND/OR CONTROLLING OF A FOOD PRODUCT DISPENSING MACHINE USING A TAG-TYPE COMMUNICATION DEVICE

(75) Inventors: Kevin R. Thomas, New Milford, CT (US); Donald Cardwell, New Milford, CT (US); Ruguo Hu, New Milford, CT (US)

(73) Assignees: Nestec S.A., (CH); Societe des Produits Nestle S.A., (CH)

( * ) Notice: Subject to any disclaimer, the term of this patent is extended or adjusted under 35 U.S.C. 154(b) by 0 days.

(21) Appl. No.: 09/898,255

(22) Filed: Jul. 3, 2001

(65) Prior Publication Data
US 2003/0006281 A1 Jan. 9, 2003

(51) Int. Cl.
*G06F 17/60* (2006.01)
(52) U.S. Cl. .................. 235/381; 235/381; 235/462.46
(58) Field of Classification Search ................ 235/385, 235/381, 383, 436, 462.13, 462.46, 472.02
See application file for complete search history.

(56) References Cited

U.S. PATENT DOCUMENTS

| | | | |
|---|---|---|---|
| 5,072,660 A | 12/1991 | Helbing | 99/280 |
| 5,280,159 A | 1/1994 | Schultz et al. | |
| 5,285,041 A | 2/1994 | Wright | |
| 5,347,263 A | 9/1994 | Carroll et al. | |
| 5,353,692 A * | 10/1994 | Reese et al. | 99/289 T |
| 5,611,051 A | 3/1997 | Pirelli | |
| 5,691,684 A * | 11/1997 | Murrah | 235/385 |
| 5,715,555 A | 2/1998 | Reber et al. | |
| 5,785,181 A | 7/1998 | Quartararo, Jr. | |
| 5,798,694 A | 8/1998 | Reber et al. | 340/540 |
| 5,818,021 A | 10/1998 | Szewczykowski | |
| 5,936,527 A * | 8/1999 | Isaacman et al. | 340/572.1 |
| 5,974,950 A | 11/1999 | King | |
| 6,047,579 A | 4/2000 | Schmitz | |
| 6,056,194 A | 5/2000 | Kolls | |
| 6,059,142 A * | 5/2000 | Wittern et al. | 221/1 |
| 6,117,471 A | 9/2000 | King | |
| 6,131,812 A * | 10/2000 | Schneider | 235/385 |
| 6,294,997 B1 * | 9/2001 | Paratore et al. | 235/385 |
| 6,390,364 B1 * | 5/2002 | Matsushita | 235/383 |
| 6,444,961 B1 * | 9/2002 | Clothier et al. | 219/622 |
| 6,445,976 B1 * | 9/2002 | Ostro | 705/26 |
| 6,751,525 B1 * | 6/2004 | Crisp, III | 700/241 |
| 2001/0054083 A1 * | 12/2001 | Defosse | 709/217 |
| 2002/0048621 A1 | 4/2002 | Boyd et al. | 426/77 |
| 2002/0059175 A1 | 5/2002 | Nakano | |

FOREIGN PATENT DOCUMENTS

| | | |
|---|---|---|
| EP | 0 449 533 | 10/1991 |
| EP | 0 451 980 | 10/1991 |
| EP | 615 285 A2 | 9/1994 |
| EP | 0 861 788 A1 | 9/1998 |

(Continued)

*Primary Examiner*—Daniel Stcyr
(74) *Attorney, Agent, or Firm*—Bell, Boyd & Lloyd LLC

(57) ABSTRACT

A method of and system for providing machine-readable tags, preferably programmable RFID tags are provided. In one embodiment of the present invention, a receptacle having at least one wall member that defines an enclosure and a tag associated with the receptacle, which includes machine-readable information regarding a product occupying the enclosure is provided. In accordance with another embodiment of the invention, the tag includes identification information in electronic form for the product.

28 Claims, 8 Drawing Sheets

FOREIGN PATENT DOCUMENTS

| | | | |
|---|---|---|---|
| EP | 1174667 | * | 2/2001 |
| JP | 410215998 | * | 8/1998 |
| WO | WO 00/45331 | | 8/2000 |
| WO | WO 01/12036 A2 | | 2/2001 |
| WO | WO 01/17893 A2 | | 3/2001 |
| WO | WO 01/260R47 A1 | | 4/2001 |
| WO | WO 01/43088 | | 6/2001 |
| WO | WO 02/28241 | | 4/2002 |

* cited by examiner

… (1)

METHOD AND SYSTEM OF SETTING AND/OR CONTROLLING OF A FOOD PRODUCT DISPENSING MACHINE USING A TAG-TYPE COMMUNICATION DEVICE

FIELD OF THE INVENTION

The invention relates to methods and systems for providing a dispensing device such as a beverage vending machine and similar, by using a communication device capable of communicating data to the dispensing machine. More specifically, the invention relates to methods and systems for managing a dispensing device by using radio frequency ("RF") communication tags attached to or embedded on the package containing the food material to be dispensed.

BACKGROUND OF THE INVENTION

Radio frequency identification tags (hereinafter referred to as "RFIDs") are well-known electronic devices which have uses in many areas. An RFID works by first recording or "burning in" identification or other data on the RFID device. Thereafter, the RFID sends the recorded identification or other information to the RFID reading device. A particular advantage of RFIDs over bar code, optical characters and magnetic storage (such as the magnetic strip on many credit cards) is that the RFID does not require physical contact, or as is the case with optical character and bar code readers, line of sight, between the tag and the reading device to be read.

RFIDs come in two varieties: active and passive. An active RFID includes a battery or other power source, and is activated by a signal from a reading device. The activated RFID then broadcasts its identification or other data, which is picked up by the reading device. An advantage of active RFID's over passive RFIDs is that the inclusion of a power source allows the active RFID to transmit to a receiver without entering into an electromagnetic field to power the tag circuit. They are also generally able to transmit over a longer distance. This has led to its use in automatic toll-paying systems, such as EZ-Pass™. An active RFID has several disadvantages compared to a passive RFID. Since it requires a battery or other power source, it is more expensive and heavier then a passive RFID. More importantly, the active RFID becomes useless when the battery or other power source is depleted.

Passive RFIDs have no power supply per se, but power is provided to the RFID circuitry by using an electromagnetic power receiver. The RFID reading device sends power to the RFID's electromagnetic power receiver, thus powering up or turning on the RFID's circuits. Next, the passive RFID broadcasts a response signal containing identification or other information, which is then read by the reading device. Since the passive RFID has no battery, it is less expensive and lighter. Passive RFIDs have been in use for some time, notably in security access cards where the user holds the card near the card reader to unlock a door, and in clothing stores as security tags attached to expensive clothing items. Until recently, this technology has been prohibitively expensive for use in food product dispensing.

Food product dispensing machines come in a numerous variety, depending upon the food product being dispensed and the preparation steps required. Food products so dispensed may be solid or liquid, and may be dispensed at room temperature, hot, cold, or any other temperature. Additional preparation steps may be involved, such as adding a diluent, mixing, whipping, heating, etc. Although the following discussion focuses on prepared beverage dispensing machines and their associated processing, as one of ordinary skill in the art of vended or machine-dispensed foods will realize, the background and invention herein described applies equally to dispensing of other food products.

Conventional beverage dispensing machines employ food material, such as powder products, concentrates or ready-to-drink products ("RTD"), which are refilled in the machine on a regular basis by a food service operator or route person. The dispensing machine may perform a number of operations to deliver a cold or warm beverage to the user. Typically, powder products or concentrates are maintained in storage areas, dosed on demand according to a desired dilution rate, mixed with a cold or hot diluent, usually water, in a mixing area and delivered in a dispensing container. RTD products may be maintained under specialized storage conditions, such as under refrigeration or other temperature control for sanitary and organoleptic reasons. These products will typically have a more limited shelf life. It is also common for the shelf life of RTD products to be altered or shortened when opened or punctured and placed into the unit for dispensing. As an example, an RTD product may have an unopened shelf life of 6 months to 1 year under proper storage conditions. However, when the product is open and placed in the dispenser the product will now have an opened shelf life which is much shorter (possibly 7–14 days), which is usually dependent from the day of opening of the package.

Beverage dispensing machines which use powder or concentrates may store these ingredients in bins which are then refilled by the food service operator, with each bin holding powder or concentrates for multiple servings of the beverage. Powder products may be stored in disposable packages such as flow wrap packs, that are used for refilling the reservoirs or hoppers of the dispensing machines. The package itself may alternatively be adapted to remain in the machine and to serve as a reservoir or bin. Alternatively, the powder or concentrate may be held in a single-serving packet, which are also refilled by the food service operator. When multiple packets are used, each packet is opened by the beverage dispensing machine at the time it is being dispensed.

There may exist a variety of instructions and variables pertaining to beverage reconstitution in the machine. For example, the machine may need to be instructed of the proper amount of a powder or concentrate to use. Other variables include the amount of diluent needed, which may depend upon which powder or concentrate is used and the nature of the beverage to be prepared, the temperature at which the beverage should be served, and the degree of whipping, if any, required to provide a foamy texture, etc.

Usually, dispensing machines are preprogrammed in the factory to receive specific types of foodstuff in order to make a limited number of specific types of beverages. When the instructions to the machine need to be modified for any reason such as because of modifications of the composition of the refill food product or because new types of food product are demanded, the dispensing machine should be reprogrammed. Reprogramming currently is accomplished by having a technically trained food service operator visit the dispensing machine on-site, or by returning the dispensing machine to the factory. On-site programming is generally preferred for reasons of cost and flexibility. This, however, requires the food service operator to be equipped with portable programming to utilize a local controller interface and to be sufficiently qualified to use the equipment. Also, the food service operator should insure that the data and instructions are correctly loaded into the dispensing machine. This, in turn, requires that the food service operator should run tests of beverage preparation at each machine that is reprogrammed. Portable equipment usually needs to be frequently updated with data, instructions, and other software specialized for the types of foodstuff with which the dispensing machine is to be filled. The number of variables used in programming should be limited and the instructions simplified to avoid incorrect operations, errors and confusion, malfunction of the machine, and consequently inconvenience to the consumer.

Therefore, it would be desirable to provide instructions and variables to the machine which specifically refer to the product to be refilled while eliminating the need for an operator's manual or semi-automatic programming with portable programming equipment, or for returning the machine to the factory. It would also be desirable to provide a flexible and operational system for immediately programming a dispensing machine to accommodate each and every type of refill food product that may be dispensed, without limiting the number of variables, data, instruction schemes, code or other information used in the programming. Therefore, it would be desirable to program the dispensing machine more frequently, and without the assistance of a food service operator, or at least with minimal operator assistance. It would also be desirable to customize this more-frequent programming for each product dispensed from the machine, and remove the need for an operator to do a test run of each programmed product on every programmed dispensing machine.

Another shortcoming of current beverage dispensing systems is that it is almost impossible to control the vending of food products that the dispensing machine is not intended for. These food products may be undesirable for various reasons. For example, the food products may not meet quality and/or safety standards. For instance, the dispensing machine may accept low quality coffee, milk powder or concentrates the same way it may accept premium or top quality food products. There is also a risk of the consumer being deceived by products that may not meet the consumer's legitimate expectation, especially when the machines are branded with famous food product brands.

Similarly, dispensing machines are unable to refuse or reject powders or concentrates for which the deadline or expiration date for vending has expired. This is particularly dangerous when low acid food products, such as dairy products, are used. There could also be a potential risk of causing serious food poisoning. It would be desirable to ensure that the food product dispensed from the machine is always of sufficient quality to guarantee safety, and that, if it does not, to ensure the product cannot be vended to the consumer. If the food product in the machine is not desirable or is no longer desirable, there is a need for easy detection and tracking of the food product. This would allow for sufficient and immediate steps to be taken to replace the food product and ensure service to the consumer without significant disruption.

Therefore, it would also be advantageous to not only have the machine be able to detect such undesirable food products, but to then send a notification to either the consumer and/or the food service operator. Of course, the notification to the consumer might be simplified to merely indicate that the chosen food product is not available.

Another shortcoming of existing food product dispensing systems is the limited ability to collect and retrieve historical information or usage data. For example, usage information might be gathered to gain a better understanding of consumer habits, or conversely, for providing information to the customer such as nutritional facts, promotional information, etc. Therefore, it would be desirable for a food product dispensing system to retrieve information or usage data and/or to provide information to the customer using the food product dispensing system as an information retrieval and/or disseminating system.

U.S. Pat. No. 5,285,041 to Wright ("041 patent") relates to a food vending system which is integrated with a specially-shaped oven for providing hot food service. The device is capable of being automatically instructed to vend food using different temperatures, cooking cycles or time periods by using a standardized package that matches the specially-shaped oven cavity and a bar code on the package. The bar code is read by a bar code reader when a selected package is taken from the dispenser outlet and inserted in the specially-shaped oven. The device includes a bar code reader to read codes printed on the food package, and allows that a magnetic or optical character reader may be alternatively used. Further, in order to ensure a proper reading of the code, the food packaging is standardized and the microwave oven has a specialized shape which matches the food product packaging. The package is held in a predetermined position by the specialized shape of the oven cavity, and the bar code reader is located in a predetermined position in the oven cavity. Thus, the code printed on the food package is automatically read by the bar code reader when the package is inserted in the oven. The device is adapted to accommodate three-dimensional products such as pizza packs of predetermined shape that properly match the reading zone. In particular, to read information, the device of the prior art needs to ensure the product properly matches the shape of the reading zone so that the bar code reader can properly read the bar, magnetic or optical code imprinted on the exterior of the product package.

Raw beverage-making materials are often packed in bulk in flow wrap packs that are not often left in the device, but only used for refilling the raw beverage-making material in hoppers arranged in the device. The device of the '041 patent would not be adaptable to receive information, decode and instruct from a variety of different raw beverage-making materials in such hoppers, such as coffee, cocoa, milk or soup powders, concentrates or RTD, which do not necessarily have a well defined three-dimensional package.

Also, it would be desirable to propose a method that allows the communication of vending instructions and/or other data to a food product dispensing device from a package that does not necessarily need to match the shape of a preformed reading zone of the dispensing device, and does not require either physical contact or a line-of-sight between the reading device and the package.

Current inventory control and tracking systems for food products require operator input at several points in the packaging, shipping, and food product dispensing process. For example, the factory would gather the raw food product and place it into containers, such as flow packs (for some powdered beverages). At this stage, an operator might record, possibly in a computer database, a batch or identification number.

Later, another operator would note where the batch of product was shipped for distribution in a log of information. It is possible that the food service operator might make a further notation on another log when the product is finally loaded into the dispensing machine.

Thus, it would be desirable to have a system which allows for the tracking of a product from the factory to the final dispensing to a consumer without the need for an operator to manually input the product information. Also, a desirable characteristic of such a system would be the ability to track a large amount of information, not merely a product and/or batch identification number, but also information such as expiration date, preparation instructions, and more.

It would also be desirable to have a system that provides for tracking of certain variables and/or other data from a product in order to guarantee safety, quality and to retrieve other useful information.

SUMMARY OF THE INVENTION

The invention relates to an article comprising a receptacle having at least one wall member that defines an enclosure, a food- or beverage-forming product present within the enclosure, and a tag associated with the receptacle, wherein the tag includes machine-readable information regarding the product. Advantageously, the tag is programmable. Preferably, the tag is an RFID device which includes identification information in electronic form for the product, includes instructions in electronic form for preparation of the product, includes a date of expiration in electronic form for the product, or includes a set of information in electronic form regarding features, characteristics or properties of the product.

When the tag includes expiration date information, it may be determined relative to two different scenarios. The first is when the receptacle and the associated product are within the pre-determined acceptable life-span and placed into the container. The second is when the receptacle and associated product are not within the acceptable life-span, opened and placed with the dispenser. In the present application, reference to "date information" refers to any possible time related information data that provides directly or indirectly an indication or reference to time including but not necessarily limited to a calendar date or a time related code. Typically, the food- or beverage-forming product provides a single serving portion of the food or beverage, but multiple serving portions can be provided if desired. When multiple portions are dispensed, the calculation of the expiration date may even be of more importance to obtain the appropriate organoleptic properties of the food or beverage.

Another embodiment relates to a method of dispensing a food or beverage, which method comprises encoding instructions for preparation of the food or beverage on a machine-readable tag associated with a receptacle that contains a food-forming or beverage-forming product; placing the receptacle in or sufficiently close to a dispenser; reading of the machine-readable tag by the dispenser prior to preparation of the food or beverage to be dispensed; and executing the instructions encoded on the machine-readable tag by the dispenser to dispense the food or beverage.

The invention also relates to a method of controlling the dispensing of a food or beverage product from a food-forming or beverage-forming product, which method comprises encoding a verification code on a machine-readable tag associated with a receptacle that contains a food-forming or beverage-forming product; placing the receptacle in a dispenser; reading of the machine-readable tag by the dispenser prior to preparation or dispensing of the food or beverage; and comparing of the verification code read from the machine-readable tag with a list of valid verification codes. The food or beverage is prepared and dispensed when the verification code read from the machine-readable tag matches a valid verification code from the list but an error code is generated when it does not. In this method, the error code can disable the dispenser from preparing or dispensing the food or beverage. Alternatively, the error code can notify a consumer that the product selected for dispensing is not available, or can notify an operator of the dispenser that an invalid product verification code has been read.

The invention also relates to a method of determining consumption of foods or beverages from a dispenser, which method comprises recording information on a machine-readable tag associated with a receptacle that contains a food-forming or beverage-forming product; updating a computer database with the recorded information; reading of the machine-readable tag by the dispenser when the food or beverage is dispensed; updating the computer database with information about the foods or beverages that are dispensed; and sorting the information to determine consumption patterns for the foods or beverages that are dispensed. This method includes the steps of reading the machine-readable tag before the receptacle is delivered to the dispenser to obtain supply information; updating the computer database with the supply information; and sorting the information to determine supply sources of the receptacles for the dispenser. Also, the consumption pattern information can be used to schedule times for resupplying the dispenser with receptacles.

Another embodiment of the invention relates to a system for dispensing a product, comprising a dispenser for holding one or more receptacles as described herein, and for preparing and dispensing a food or beverage from the food-forming or beverage-forming product(s) of the receptacle(s). The receptacle is generally composed of a non-conductive material and the tag is located within the enclosure. When the receptacle is composed of a conductive material, the tag may be attached to the at least one wall member on a side opposite that of the enclosure.

In another embodiment of the invention, the system for dispensing a product is adapted to receive instructions from a dispensable receptacle for the purpose of refilling the dispenser with the raw material.

The tag is preferably an RFID device that includes information in electronic form regarding the features, properties or processing of the product, and the dispenser includes a tag reader for reading the tag, and a processor having memory operatively associated with the dispenser, and the tag reader, and a connection to an external communications network. The processor is preferably configured to signal the tag reader to read the tag; receive information read from the tag by the tag reader; store the information in the memory; and place the information on the external communications network.

The tag may includes product preparation instructions in electronic form and the processor is also configured to carry out the instructions to prepare and dispense the product, and the processor sets one of an operating temperature, a dilution ratio, a mixing time, or a dispensing time for the dispenser in accordance with the set of instructions in electronic form. If desired, the processor can be further configured to read a current time and date from an electronic clock, and then the processor compares the current time and date with a time and date of expiration contained in the set of information. When the current time and date is earlier than or equal to the time and date of expiration, processor disables the dispenser from dispensing the product. Also, when the current time and date is earlier than or equal to the time and date of expiration, the processor places a data set on the external communications network, the data set to include a name of the product, the time and date of expiration, and an indicia of identification for the dispenser.

Yet another embodiment of the invention relates to a system for authenticating and dispensing a prepared product, comprising a plurality of receptacles, each having at least one wall member that defines an enclosed area containing a food- or beverage-forming product and a machine-readable tag associated with each receptacle, a mechanism for extracting the food- or beverage-forming product from each receptacle, and preparing a food or beverage from food- or beverage-forming product(s), a device for reading the machine-readable tag, and a processor operatively coupled to the device and the mechanism, the processor configured to collect information from the machine-readable tag from the device for reading the machine-readable tag; compare the collected information with a pre-determined quality indicia; control the mechanism to extract and prepare the food or beverage when the collected information matches the pre-determined quality indicia; and preventing the mechanism from extracting or preparing the food of beverage when the collected information does not match the pre-determined quality indicia. As above, the machine-readable tag is an RFID and the device for reading the machine-readable tag is an RFID reader. The pre-determined quality indicia typically is a brand name, an indication of origin, a generic product grading or an expiration date.

DETAILED DESCRIPTION OF THE PREFERRED EMBODIMENT

Figure 1:
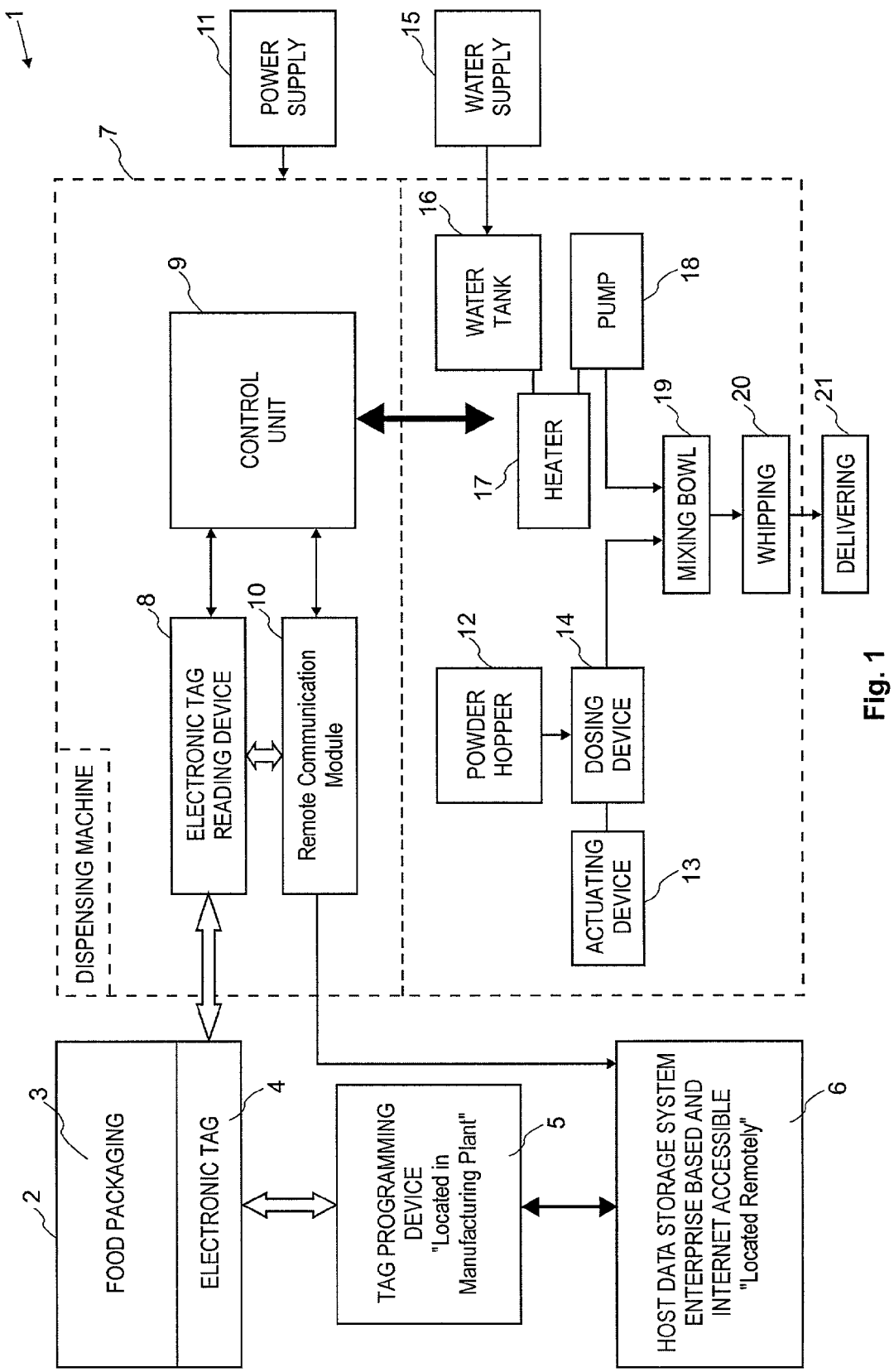
FIG. 1 is a block diagram depiction of a system of a food product vending machine in according to a preferred embodiment of the present invention.

The following description is presented to enable any person of ordinary skill in the art to make and use the present invention. Various modifications to the preferred embodiment will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

The present method includes various features, including: providing instructions and variables to a food product dispensing machine which specifically refers to the product to be refilled without the need for operator intervention or a factory trip; providing a method and system for programming identification, preparation, and other information onto a tag to be associated with a food product to be dispensed by a machine; providing a flexible and operational system for immediately programming a food product dispensing machine; providing for frequent programming of a food product dispensing machine; providing for a food product vending machine to be programmed in a customized way; providing for the control of vending of products other than that which the food product dispensing machine was designed for; providing a method to ensure that food product dispensed from a machine is of sufficient quality to guarantee safety for the consumer; providing the ability to gather and retrieve information, including usage data from a food product dispensing machine; providing the ability to communicate information and/or data to a consumer using a food product dispensing machine; providing a method that allows communication of vending instructions and/or other data from a food product package not necessarily matching the shape of a preformed reading zone of a food product dispensing machine; and providing a system that allows for suitable tracking of certain variables or other data from a dispensed food product in order to guarantee product safety, quality and/or retrieval of useful information.

The ability to provide instructions and variables to a food product dispensing machine which specifically refers to the product to be refilled without the need for operator intervention or a factory trip is advantageous for optimum dispensing of the food product, compared to a device that operates on standard processing conditions for all food products.

The flexibility of the operational system for immediately programming a food product dispensing machine contributes to the versatility of the device. For example, the device is capable of frequent programming and reprogramming depending upon the specific food product to be dispensed, which product is ascertained by the device prior to dispensing. Thus, the food product dispensing machine of a preferred embodiment of the invention can be programmed in a customized way depending upon the type of product to be dispensed.

Another advantage of the present invention is that it prevents the vending of products other than that which the food product dispensing machine was initially designed for, thus avoiding undesired product substitutions. As one can appreciate, when a certain brand of drink is desired, the substitution of an inferior product would not be seen by the end user, and the device becomes inoperable in this situation to protect the goodwill and reputation of the branded product. Also, the present invention provides a method to ensure that food product dispensed from a machine is of sufficient quality to guarantee safety for the consumer.

Another advantage of the present invention is that provides the ability to gather and retrieve information, including usage data from a food product dispensing machine. Thus enables the food product manufacturer to plan service times for re-filling the machine, as well as obtain demographic data for strategic market planning. Thus, the dispensing devices can be filled only with desirable products, thus increasing product turnover and profitability.

The present invention also provides the ability to communicate information and/or data to a consumer using a food product dispensing machine, such as product attributes or nutritional information, as well as an economic benefit, such as an electronic coupon or other future discount or rebate due to purchase of the product.

In addition, the present invention provides a method that allows communication of vending instructions and/or other data from a food product package not necessarily matching the shape of a preformed reading zone of a food product dispensing machine. The tag enables quick and accurate reading of the product vending instructions regardless of the exact positioning of the package.

Finally, the present invention also provides the advantage that the system allows for suitable tracking of certain variables or other data from a dispensed food product in order to guarantee product safety, quality and/or retrieval of useful information. This tracking can occur from the time the product is prepared at the manufacturer's location, through packaging and shipping, delivery to the location where the machine is located to final vending of the product.

Turning now to the drawings, FIG. 1 is a block diagram depiction of a system of a food product vending machine according to a preferred embodiment of the present invention 1. The food product container 2 includes the actual food packaging 3 and an RFID 4. The food packaging 3 may contain an individual serving of the food product, or may be a package containing a larger quantity, sufficient for multiple servings. As an example, a powdered drink mix may be packaged in a disposable vacuum pack containing enough dry powder mix for several reconstituted servings of a beverage. In this case, the food package 3 is emptied into a powder hopper 12 by a food service operator. Alternatively, the food packaging may be a multi-serving flexible bag or pouch with a fitment, as known in the art, containing a liquid concentrate that is arranged in fluid communication with tubings of the dispensing machine 7. Alternatively, the food packaging 3 may consist of a single-serving packet, which may be opened by a dispensing machine 7 without the need for storage in an intermediate powder hopper 12.

The RFID 4 is associated with the food packaging 3 in a manner which allows for the RFID 4 to be programmed by an RFID tag programming device 5, which may be located in the manufacturing plant, and read by an electronic tag reader 8 associated with the dispensing machine 7. For example, in the case of food packaging 3 with a quantity of a dry powder food product or concentrate, if the food packaging 3 is of a material that blocks or partially blocks radio signals, such as metallicized plastic, the RFID 4 should be affixed to an exterior surface of the food packaging 3. Alternatively, if the food packaging 3 is transparent to radio signals, such as a thin layer of wax paper, the RFID 4 may be affixed to either an interior or exterior surface of the food packaging 3. Another example is a flow-wrap pack containing multiple servings of a dry powder food product. If such a pack were made of a material which allows radio signals to pass through it without changing the radio signals, then the RFID 4 may be affixed to an interior surface of the flow-wrap pack, or even left loose in the pack, or inserted into a pocket or compartment, either internal or external.

The RFID 4 on or in the food package 3 is first read by first programmed with information ("tag data") in the manufacturing plant by a RFID programming device 5. Many different types of information may be programmed into the RFID at the manufacturing plant. Such information may include the type and quality of the food product, the brand or manufacturer of the food product, the expiration date of the food product, the "born on" data of the food product, identification of the manufacturing and packaging center, warehouse(s) at which the food product was stored, and even the personnel who have come into contact with the food product. Importantly, it may also include information relevant to the preparation of the food product, such as preparation and service temperature(s), preparation steps, duration and speed of blending, mixing, and/or whipping to create the final food product for dispensing to the consumer.

This tag data, along with other information, may also be sent to a host data storage system 6, which may be an enterprise-based network and/or Internet accessible. The RFID may have information programmed into or read from it at various stages of the manufacturing, warehousing, shipping, distribution, and/or dispensing processes. This information may also be stored into a host data system 6, which, in turn may be accessed via a network or the Internet.

While the preferred embodiment makes extensive use of host data storage and the Internet, as well known to those of knowledge in the arts of computer science and communications, "host data storage" may actually include a large variety of hardware and software combinations. Likewise, any communications network may substitute for the Internet without changing the scope or meaning of the present invention.

When the food product container 3 is loaded into a dispensing machine 7 by a food service operator, the RFID 4 is read by an RFID reading device 8. The dispensing machine depicted in FIG. 1 includes an RFID reading device 8 operated by a control unit 9, both powered by a power supply 11. Depending on the configuration of the food packaging 3 and the placement of the RFID 4, there are actually several options as to when the RFID 4 is read by the RFID reading device 8. For example, when a multiple-serving flow-wrap package is used, the food service operator generally opens the flow-wrap package when the dispensing machine 7 is loaded. In this procedure, the operator would open the dispensing machine 7 to expose at least one powder hopper 12, open the package, load the food product into the hopper 12, and close the dispensing machine 7. Due to the proximity of the RFID with the reading device 8, the RFID associated with the food package 3 is automatically scanned using the dispensing machine's RFID reading device 8. The empty flow-wrap package and its associated RFID 4 may then be discarded or returned to the manufacturing center. Alternatively, the RFID 4 may be left in or attached to the powder hopper 12, thereby allowing the RFID 4 to be read at a later time, such as when the consumer orders the food product to be dispensed. Of course, in this instance the food service operator would preferably remove the tag from an empty powder hopper 12 prior to filling the hopper 12. The removed RFID would likewise be discarded or, preferably, returned to the manufacturing plant for reuse. In order to ensure a proper reading of the RFID, the electronic reading device 8 may preferably comprise a plurality of multiplexed read points located close to the hoppers. Each read point may be activated to read one or several RFID. In order to ensure a proper reading of the RFID several different methods of implementation could be used. The electronic reading device 8 may preferably be comprised of a plurality of multiplexed read points each located within very close proximity to the hopper and limited read distances of anywhere from zero, requiring physical contact with the tag 4, to several inches, thus eliminating the opportunity of false or incorrect reads. Further more a method of assurance could be employed within the machine control sequence that would require the operator to confirm the identity of the product 3 placed within each hopper 12. A second possible scenario would include only one electronic reading device 8 coupled with a machine control sequence that would prompt the operator to scan the RFID 4 and indicate which of the hoppers 12 the product 3 is being placed.

Another example would be the filling of a dispensing machine 7 with a food package containing a single serving of a food product. Again, the RFID 4 may be read at the time the operator loads the food packaging 3 into the dispensing machine 7, or it may be read at a later time, such as when the consumer selects the food product to be dispensed. Also, the RFID 4 may be read at both times. After the food product is dispensed, the empty food packaging 3 with its RFID 4 may be discarded, or preferably, recovered by the food service operator for return to the manufacturing center, where it may be reused.

When or after the RFID 4 is read, the dispensing machine's control unit 9 may communicate the tag data and other information via a remote communication module 10 to a host data storage system 6, which may be linked to an enterprise-based network, possibly via the Internet. In addition to the tag data from the RFID, the information read can include additional information, such as the type, serial number and location of the dispensing machine. It may also include sales data, such as the amount and type of food products dispensed, and even may send a notification that a machine has been tampered with, or that unapproved and/or potentially dangerous (to the consumer) food products have been loaded into the machine.

Moreover, the control unit 9 may use the tag data to orchestrate the preparation of the food product into a product ready for the consumer. This is accomplished in the case of powdered and/or concentrated beverages by first controlling the amount of a diluent, in this example water, from a supply source 15 into an internal tank 16. Storage of the diluent in an internal tank 16 may be advantageous because it allows for the diluent to be measured, filtered, and heated efficiently.

Assuming water as the diluent, the water in the water tank 16 is heated by a heater 17 to a temperature, which may be set by the control unit 9 based on tag data read from the food product container 2. Of course, when a powder hopper 12 is in use and the food packaging 3 and RFID 4 has been read and discarded or returned to the manufacturing center, the control unit 9 would preferably rely on the initial reading of the RFID 4 at the time the food service operator loaded the food product into the dispensing machine. The heater may be any sort of heating device well known in the art, including a thermoblock, a thermoelectric heater or a simple resistance coil in a water tank, as well as others.

When the water has attained the proper temperature, it is pumped by a pump 18 under the control of the control unit 9 into a mixing bowl 19.

Concurrently, a dosing device 14 operated by a actuating device 13, both under the control of the control unit 9, extracts the proper amount of the food product from the powder hopper 12, into which the contents of the food product container 2 had previously been placed.

As an alternative, the powder hopper 12 may actually be the food product container 2 itself. In this case, the dispensing machine would also be equipped with apparatus to open, empty and discard the food product container 2. The premeasured food product inside the food product container 2 would preferably be transferred into a mixing bowl 19. The discarded food product container 2 could be stored for recovery by the food service technician and return to the manufacturing center.

When a hopper 12 with multiple servings of the food product is employed, however, a quantity of food product is measured by a dosing device 14 powered by an actuating device 13 such as a DC electrical motor. The amount of food product for the dosing device 14 to extract may also be tag data. The dosing device 14 deposits the resultant measured food product into the mixing bowl 19.

The mixing bowl 19 mixes the food product with the measured proper temperature water for a duration which may also be determined from tag data. Next, a whipping apparatus 20 may whip the mixed food product to provide froth at a speed and duration which may also be determined using tag data. Finally the finished food product is delivered to the consumer 21.

Figure 2:
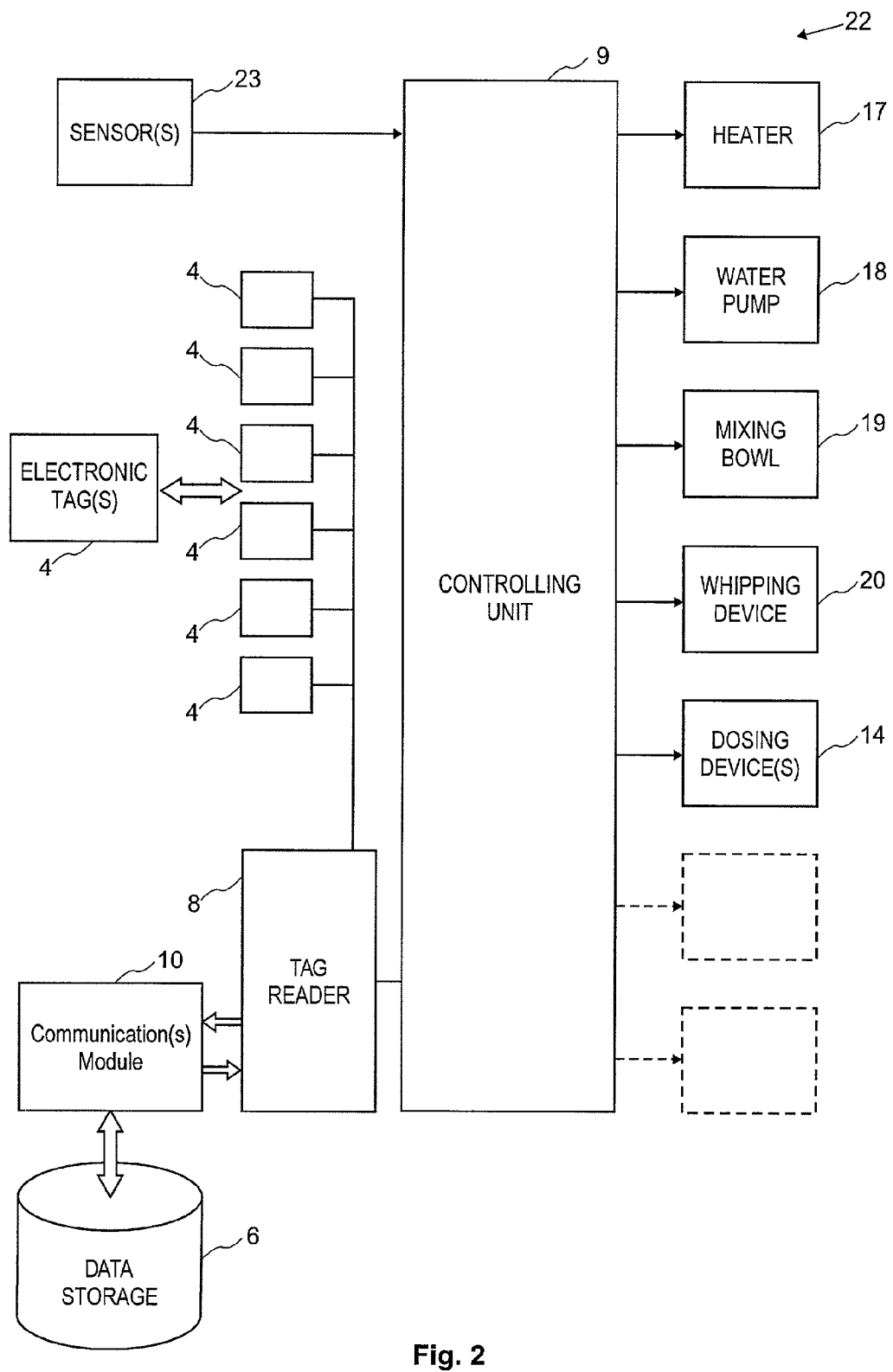
FIG. 2 is a block diagram of the controlling unit of a food product dispensing machine according to a preferred embodiment of the present invention.

Another schematic view of the controlling unit 9, its interactions and associated components in a preferred embodiment of the present invention is shown in FIG. 2. Herein the control unit 9 is associated with various sensors 23, which provide input to the control unit 9. The various sensors 23 may include but are not limited to sensors to determine if the proper money has been paid (in the case of a vending machine) and sensors to determine the food product desired by the consumer. Other sensors 23 may notify the controlling unit 9 if the dispensing device has been tampered with. Still other sensors 23 may notify a water temperature, a level of powder in a hopper, etc.

The controlling unit 9 also controls an RFID reader 8 ("tag reader"), which, in turn, is associated with one or more RFID input units 4. For example, each product channel on the dispensing machine may have a device to pick up the RFID information from an RFID 4 being loaded and/or dispensed from that channel. This information is then routed to the tag reader 8, which converts the radio frequency signals into actual digital data before sending it on to the controlling unit 9. The controlling unit 9 may then formulate a package of data and other information to send to the communications module 10, and then to a host data storage system 6.

Other devices and apparatus of the dispensing machine are then controlled by the controlling unit 9 to prepare the food product, possibly in accordance with food product preparation instructions stored on the RFID 4. These instructions may be read at the time the consumer requests the dispensing of the food product, or may be read at the time the food service operator loads the food product into the dispensing machine, in which case the controlling unit would need to store the instructions in a memory (not depicted) until needed. Alternatively, the food product preparation instructions may be stored in a host data storage system, which may be but does not need to be the same host data storage system 6 previously mentioned. In the case of offsite storage of food preparation instructions, the controlling unit 9 should then download the food preparation instructions from the host data storage system 6 using the communication module 10.

The other devices controlled by the controlling unit 9 may include but are not limited to a water heater 17, a water pump 18 (when water diluent is used), a mixing bowl 19, a whipping device 20, and dosing device(s) 14, among others. Examples of parameters controlled by the controlling unit 9 are: temperature for a water heater 17, volume for a water pump 18, speed and duration of mixing for a mixing bowl 19, speed and duration for a whipping device 20, and food product quantity for dosing device(s) 14.

Figure 3:
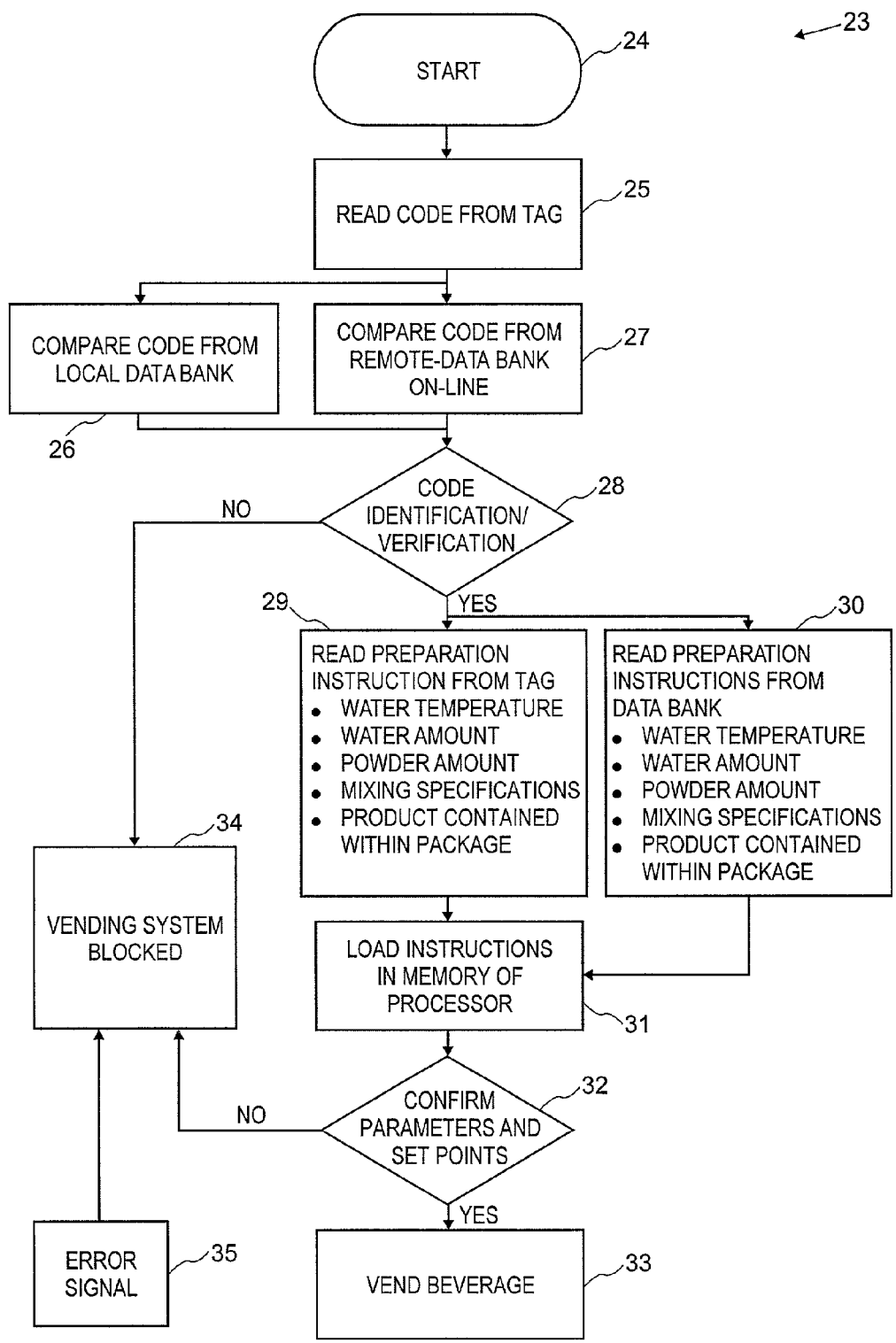
FIG. 3 is a flowchart of the action sequence of dispensing a food product according to a preferred embodiment of the present invention.

FIG. 3 depicts a flowchart of the action sequence 23 of dispensing a food product according to a preferred embodiment of the present invention. First the vending operator scans the tag and starts the process 24. Next, the consumer selects and pays for a food product. For example, the consumer might select a particular beverage product to be prepared by viewing a description of the product, possibly including a picture, then inserting coins into the dispenser and selecting a button or combination of buttons to push to indicate their preference. Payment and selection of food products from dispensing machines may take several forms. The particular means of selecting a food product and paying for it to be dispensed in not relevant to the invention herein described.

Next, the data and information for the particular food product is read from the RFID 25. Alternatively, when the RFID has been read previously as described above, the RFID data may then be retrieved from a local or remote data storage. Regardless of which method is used to obtain this data, it may include a product code which can then be compared with a reference code, either from a local data bank 26, or from a remote data bank accessed online 27, or some hybrid combination thereof. For example, a local data bank may be employed, but it may be refreshed from time to time from a remote online data bank. The comparison process 28 results in either a verification of a valid product code or non-verification. If the code is not verified, it may be the result of an incorrect or tampered-with product being placed in the dispensing machine, so the vending system will be blocked 34, and an error signal generated 35. If this occurs, the error signal may cause the control unit of the dispensing machine to activate a display visible to the consumer indicating that the desired food product is not available. Additionally, the control unit of the dispensing machine can then send a message to either the food service operator, the owner/operator of the dispensing machine, or even the manufacturer of the branded product which should be in the dispensing machine stating the error and identifying the dispensing machine. This will allow for fast corrective action to be taken.

Otherwise, if the code is verified, preparation instructions will then be read from the RFID 29. Note that the preparation instructions may have already been read at the time the code was read. If this is the case, the preparation instructions do not need to be re-read from the RFID, but may be referenced from local memory and used to prepare the product for the consumer. Alternatively, preparation instructions may be read from a data bank 30, which, of course, may be either locally or remotely stored. Regardless, the preparation instructions are stored in the memory of the processor of the control unit 31, where a final check of parameters and set points is performed 32. This final check includes but is not limited to verifying that the preparation instructions were not inadvertently corrupted (by looking at a checksum, for example) and determining that the preparation instructions make some sense (such as not requiring mixing for 45 hours, or a water temperature that will melt steel, etc.) If the check of parameters and set points 32 indicates reasonable parameters, the food product is then able to be vended to the consumer 33. Otherwise, the vending is blocked 34 and an error signal is generated 35. Again, the error signal may cause the control unit of the dispensing machine to activate a display visible to the consumer indicating that the desired food product is not available. Additionally, the control unit of the dispensing machine can then send a message to either the food service operator, the owner/operator of the dispensing machine, or even the manufacturer of the desired product stating the parameter/set point error and identifying the dispensing machine, again allowing for expedient corrective action to be taken.

Figure 4:
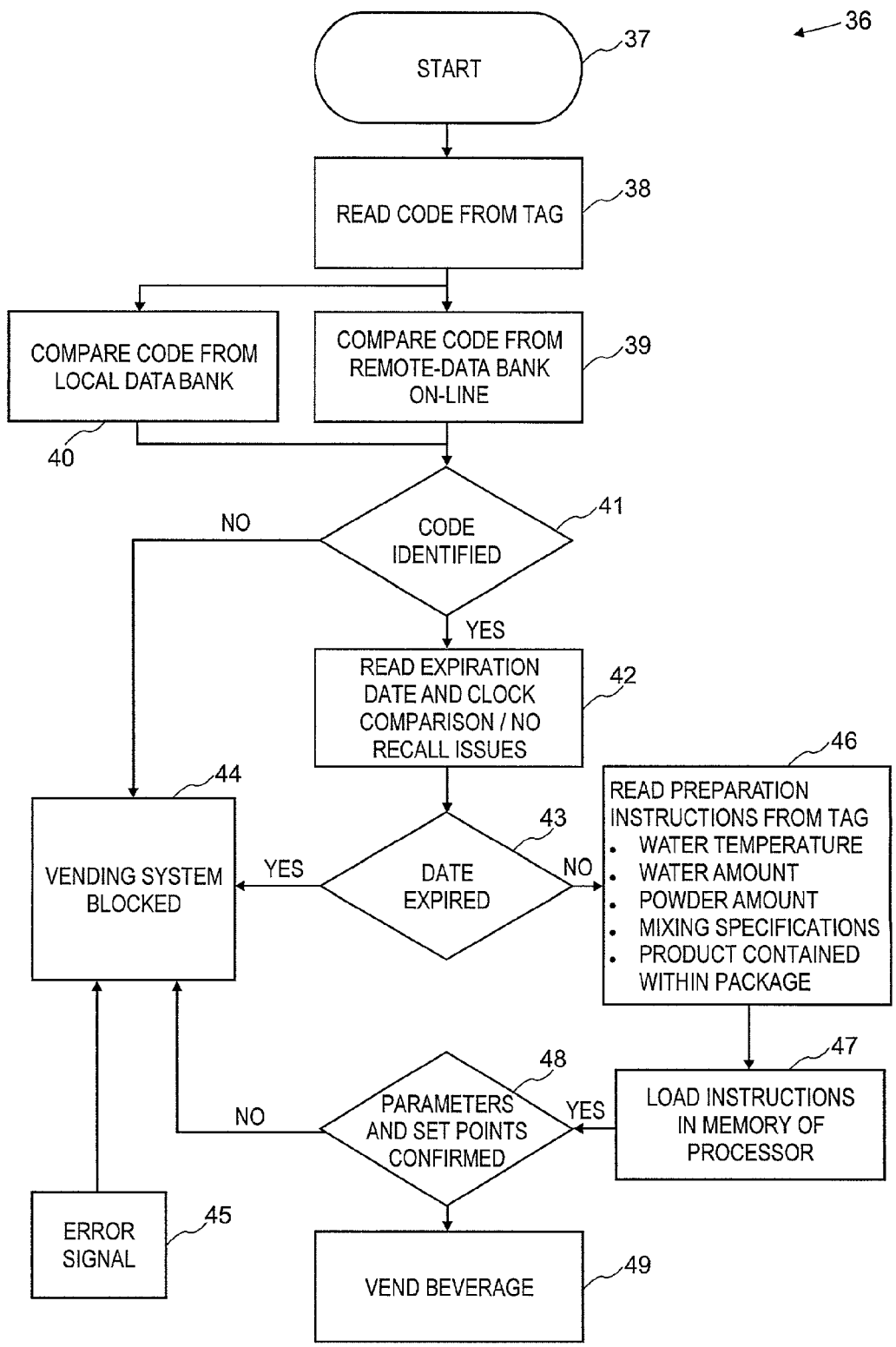
FIG. 4 is a flowchart of the action sequence of dispensing a food product including an expiration date check according to a preferred embodiment of the present invention.

Similarly, FIG. 4 depicts a flowchart of the action sequence of dispensing a food product including an expiration date check according to a preferred embodiment of the present invention. First, the vending operator scans the tag and starts the process 37. Next, the consumer selects and pays for a food product, as previously described. Then, the data and information is read from the RFID 38, or the RFID information previously read is retrieved from a local or remote data store. This data may include a product code which can then be compared with a reference code, either from a local data bank 40, or from a remote data bank accessed online 39, or some hybrid combination thereof. As in FIG. 3, the comparison process 41 results in either a verification of a valid product code or non-verification if the product code is not valid. If the product code is not verified, it may be the result of an incorrect or tampered-with product being placed in the dispensing machine, so the vending system will be blocked 44, and an error signal generated 45. This error signal may then cause the control unit to take the actions detailed above to notify the food service operator and/or others so corrective action can be taken.

Otherwise, if the code is verified, the food product expiration date is gathered from the data and other information on the RFID, as well as any product recall information 42. Product recall information preferably consists of identification indicia, such as lot numbers. When a product recall is to be made, a list of recalled product lot numbers may be made available, either from a local data bank 40, or from a remote data bank accessed online 39. If the lot number read off the RFID matches a product lot number on such a list of recalled product lot numbers, vending is blocked 44 and an error signal is generated 45. Likewise, if the expiration date is prior to the current date (as determined by either an online clock or an internal clock in association with the control unit), then the vending system is blocked 44 and an error signal is generated 45. In both cases, the error signal may cause the control unit to send a message as indicated above, in order to notify the consumer that their desired product is not available and contact the food service operator that the dispensing machine is in need of a refill of either non-recalled or newer food product.

Continuing with FIG. 4, if the food product is not beyond its expiration date, and if it has not been recalled, preparation instructions will then be read from the RFID 46. As previously mentioned, the preparation instructions might have already been read into the control unit, or may be in a local or remote data store. Ultimately, the preparation instructions are placed in the memory of the processor of the control unit 47, where a final check of parameters and set points is performed 48. If the check of parameters and set points 48 indicates reasonable parameters, the food product is then vended to the consumer 49. Otherwise, the vending is blocked 44 and an error signal is generated 45, as already described for FIG. 3.

Figure 5:
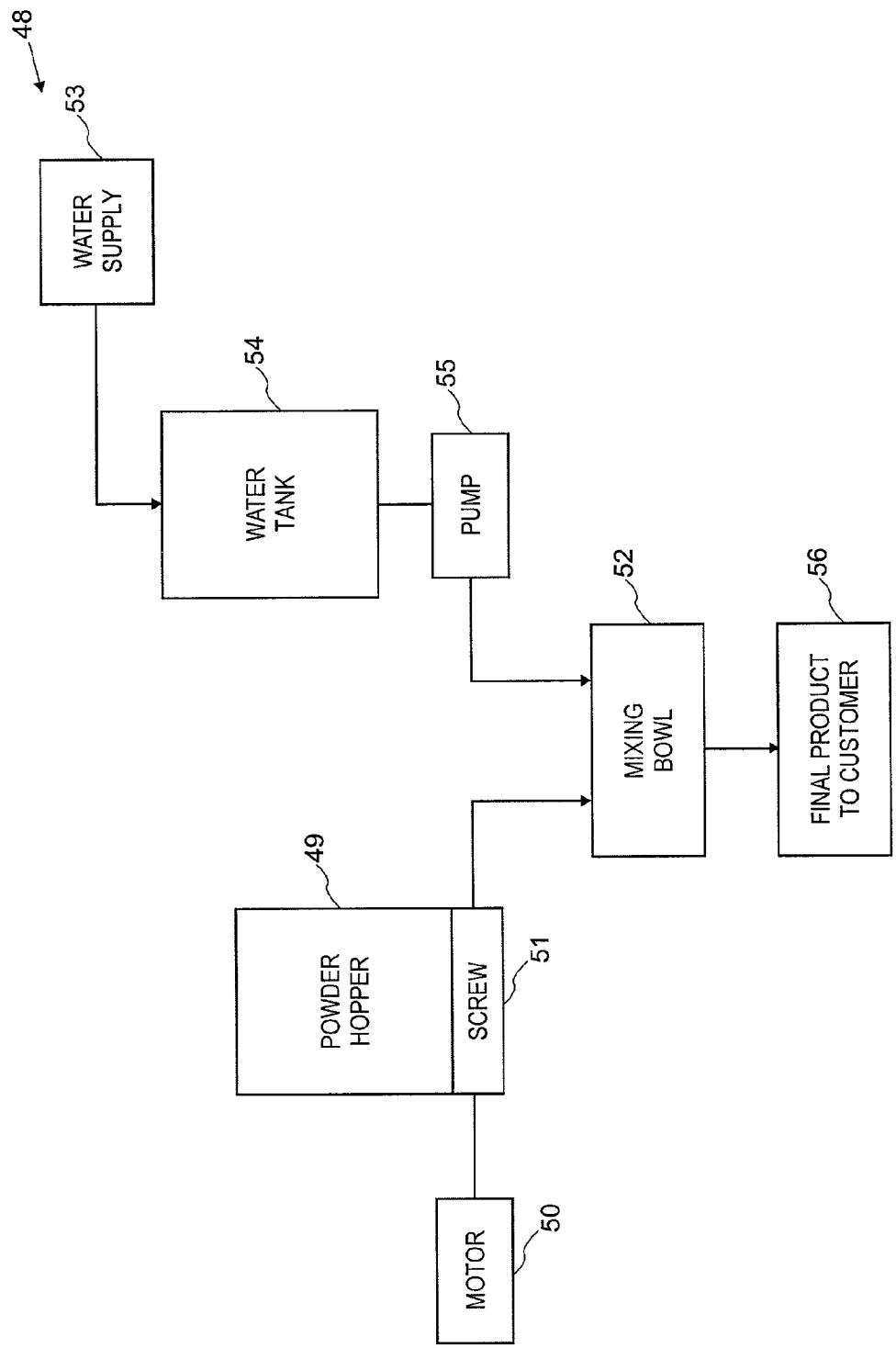
FIG. 5 is a diagram of the mechanical flow of a food dispenser system according to a preferred embodiment of the present invention.

FIG. 5 diagrams the mechanical flow of a food dispenser system according to a preferred embodiment of the present invention 48. This example describes a dispensing mechanism for mixing and dispensing a beverage reconstituted from a dry powder with a water diluent. After the consumer has selected the food product to be dispensed, a motor 50 operates a screw device 51 which transfers a predetermined quantity of the dry powdered food product from a powder hopper 49 into a mixing bowl 52. In an alternative embodiment, the screw device 51—powder hopper 49 combination is preferably replaced by a single-serving food product container itself in combination with an extraction mechanism for removing the food product from the food container and placing it into the mixing bowl 52. It would also be possible to allow for additional whipping of product to produce additional body of the beverage as identified in the system FIG. 1. This would require the addition of a whipping stage 20 after the mixing bowl. In another alternative, the food product is a liquid or extract stored in a flexible pouch or bag adapted in fluid communication with a dosing device such as a peristaltic pump or similar.

Concurrently, a water tank 54 is filled with a predetermined amount of water from a water source 53. Alternatively, the water in the water tank may be heated to prepare a hot beverage or cooled to prepare a cold beverage. The water is then pumped from the water tank 54 into the mixing bowl 52 by a pump 55. The water and powder is then mixed in the mixing bowl 52 for a predetermined time and at a predetermined speed and the final product is then delivered to the customer 56. The predetermined time and speed are preferably information carried by the RFID device and read either at the time the dispensing machine is loaded by the food service operator or at the time the consumer selects the food product.

Figure 6:
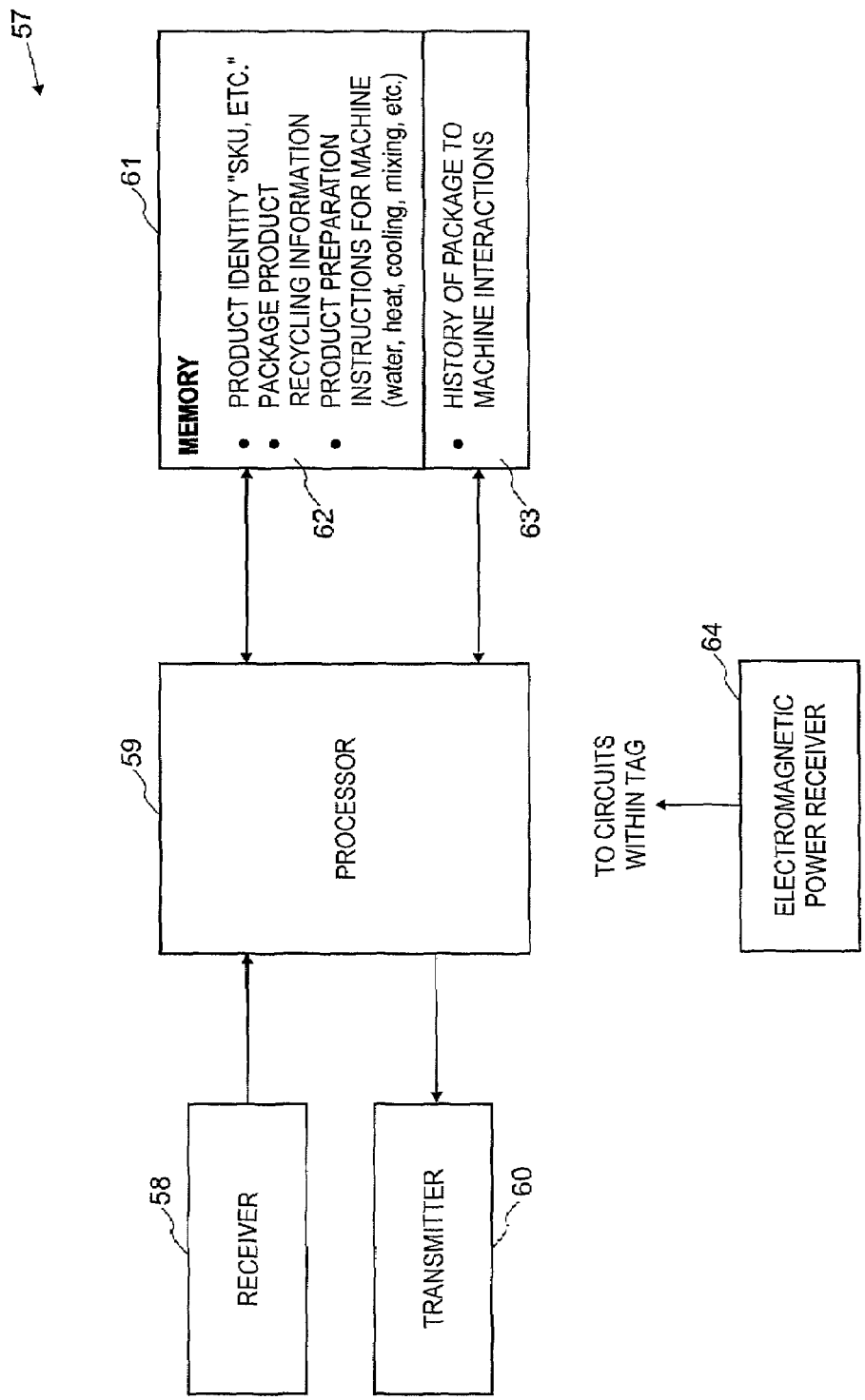
FIG. 6 is a schematic representation of the components and interactions of an RFID according to a preferred embodiment of the present invention.

FIG. 6 is a schematic representation of the components and interactions of a RFID according to a preferred embodiment of the present invention. A typical RFID is composed of circuitry the various components as depicted here. Additionally, the RFID includes an electromagnetic power receiver 64 to provide power to the various circuitry. A receiver 58 is connected to and controlled by a processor 59 with a programmable persistent memory 61. The programmable persistent memory 61 is preferably programmed via instructions received through the receiver 58 and executed upon by the processor 59. Alternatively, an RFID could be powered by a battery, in which case the battery would take the place of the electromagnetic power receiver 64. A preferred embodiment of the invention might use an RFID powered by an electromagnetic power receiver 64 due to its lower cost and lighter weight compared with an RFID with a battery.

Figure 7:
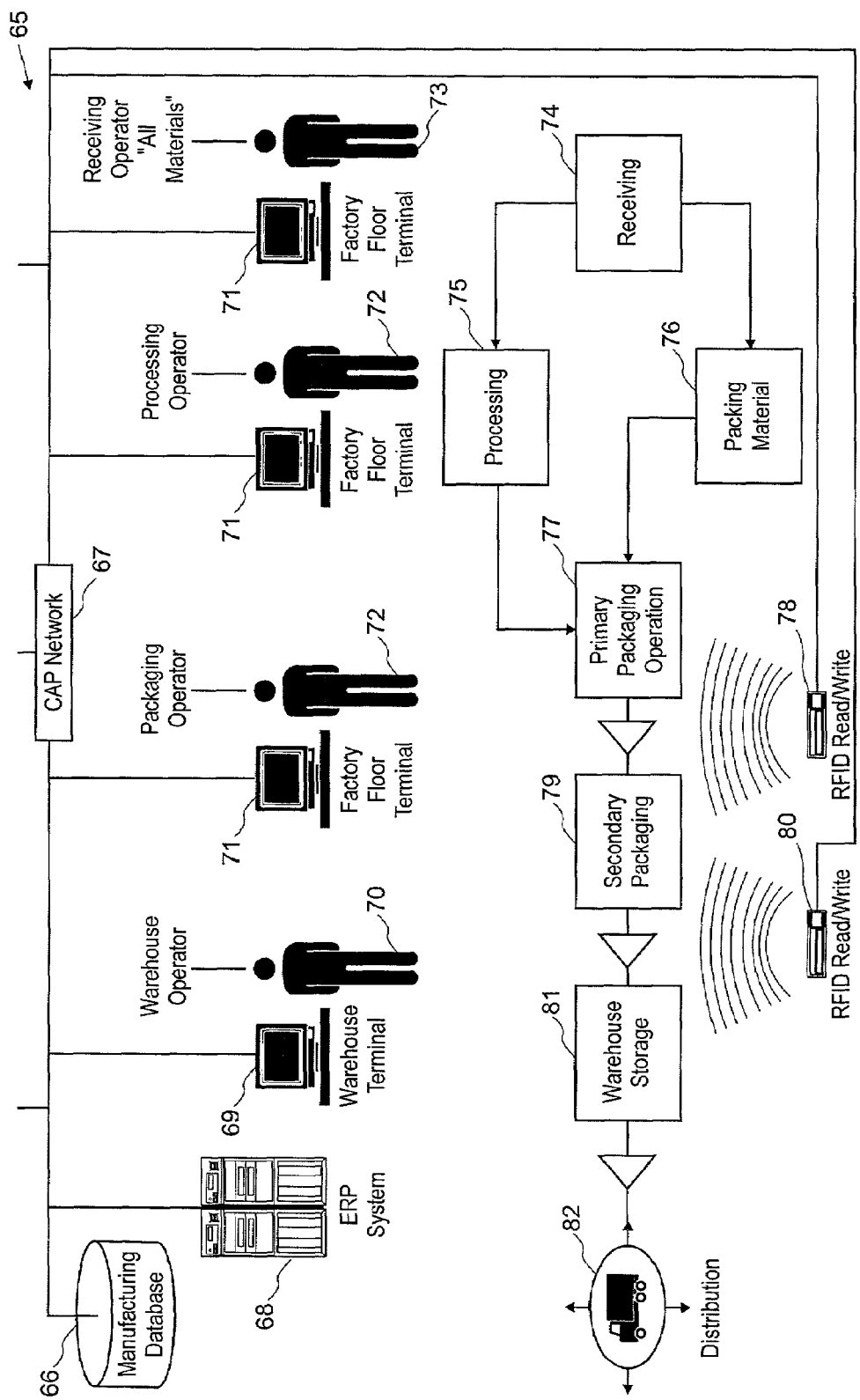
FIG. 7 is a block diagram of a broad system including inventory control in accordance with a preferred embodiment of the present invention.

FIG. 7 is a block diagram of a large-scale system including inventory control in accordance with a preferred embodiment of the present invention. A computer network 67 is employed to interconnect the various system components. The computer network is preferably enterprise-wide, and may be implemented using the Internet. Of course, the network may also connect different co-packers and vendors involved at various manufacturing stages to a centralized manufacturing authority.

A manufacturing database 66 acts as the central repository for all of the necessary data associated with material usage within the factory, processing steps, date of manufacture, product SKU information and the necessary preparation instructions associated with a particular product. The manufacturing database 66 may be implemented on a dedicated server, possibly with communication links to the Internet. Any large capacity scaleable commercial database may be used. An example of a manufacturing database 66 implementation would be on a Microsoft Windows NT™ server running the Oracle™ database package.

The computer network would connect terminals on the factory floor 71, logistics and warehousing data systems 69, and RFID reading and writing devices 78, 80 that would encode the appropriate electronic information onto the RFIDs as the food packages with the RFIDs move through the manufacturing process.

In the manufacturing process, food product, packaging supplies and RFIDs enter the receiving area 74, where the food product proceeds to processing 75 while the RFIDs proceed already associated or to be associated with the packaging material 76. This is the step at which the RFID will be attached or otherwise affixed to or placed within the food product packaging material, if not done so already. Thereupon the primary packaging operation 77 preferably takes place, and the RFID read/write device 78 programs initial information into the RFID, communicating the programmed information also to the manufacturing database 66 over the network 67.

Next, a secondary packaging operation 79 is preferably performed, in which, for example, accumulations of food product packages might be co-packaged. A second RFID read/write device 80 then continues by preferably updating the RFID and/or the manufacturing database 66. The completed package containing the food product packaged with the RFIDs is then stored in warehouse storage 81 until it is distributed 82. Upon placing the product in the warehouse the RFID may be read and the manufacturing database updated to indicate the current location of the food product. Likewise, the RFID can be read when the food product package is removed from the warehouse for distribution. There are numerous inventory-related accounting and tracking advantages to using RFIDs and a manufacturing database for keeping a record of the movement history of each food product package.

For example, it is possible to optimize the process of reordering food product to use industry-standard concepts such as the economic order quantity if better information is available about the amounts of food product in the supply pipeline. Also, knowing the expiration dates of all the food product in the various dispensing machines, warehouses, and distribution centers allows for better planning and less waste. Only the amount of a particular food product that is used needs to be replaced. So, if the manufacturing database shows that a certain dispensing machine only sells a limited quantity of a food product, the distribution center and food service operator can refill the particular dispensing machine with only a limited quantity of the food product.

Moreover, if the manufacturing database shows that a particular product's sales in a given dispensing machine differ significantly from the sale of other food products in the same machine, then the packaging process can be altered to allow the serving-volume of the packaging for the slower-selling food product to be packaged in smaller quantities. For example, if food product A sells only half as much as food product B, then the packages of A could be sized to provide half the number of servings of A as the packages of B, thus allowing the food service operator to refill both products in the dispensing machines at the same time, with less chance of waste of either food product. The scenario of altering the pack size to accomodate slow selling products is possible, though unlikely.

Figure 8:
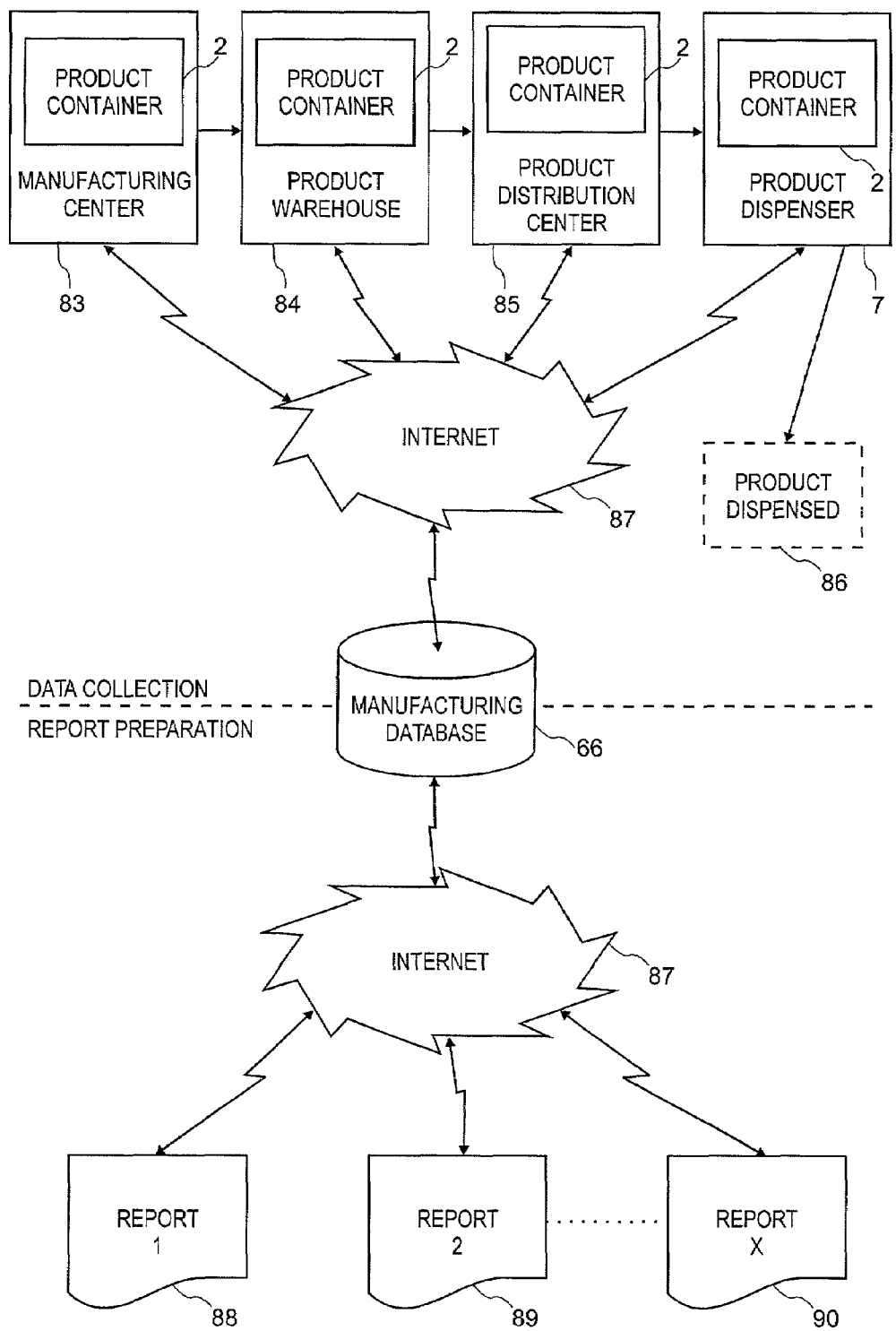
FIG. 8 is a block diagram of a manufacturing and distribution information gathering and report generation system according to a preferred embodiment of the present invention.

An example of a manufacturing and distribution information gathering and report generation system according to a preferred embodiment of the current invention is depicted in FIG. 8. When the product container 2 has been tagged and filled with food product at the manufacturing center, information which preferably includes product identification, product preparation instruction, manufacturing center, product expiration date (or, in the case of some food products, the number of until expiration days once the product container has been opened), product lot number, product validation code, and other information, are gathered at the manufacturing center 83 and deposited in a manufacturing database 66. The transfer of the information may be facilitated using the Internet 87 (and appropriate encryption or other safeguards to insure the integrity of the information stored to the manufacturing database 66). Alternatively, the a non-Internet network may be employed.

Regardless of the actual information transfer network employed, information is likewise collected and stored in a manufacturing database 66 at important phases of the product container's 2 life cycle. For example, when the product container 2 is transferred to a product warehouse for storage, the warehouse's information system 84 may update the manufacturing database 66 to indicate that the product container 2 is now at the product warehouse. Likewise, when the product container 2 leaves the product warehouse for distribution, the distribution center's information system 85 may update the manufacturing database 66 with information regarding the distribution of the product container 2, as well as other information, such as the food service operator who will be transporting the product container 2.

Later, when the product container 2 is loaded into a product dispenser 7 (or when a product container is emptied into the product dispenser 7, such as is the case with flow-wrap packages of dry powdered food products), the product dispenser 7 may update the manufacturing database 66. The product dispenser 7 may also update the manufacturing database 66 on other occasions, such as when an invalid product verification code is detected, or when a product has reached its expiration date, or for other reasons. Also, the product dispenser 7 may generate database inquiries to get information from the manufacturing database 66, such as updated product preparation instructions, a current product lot recall lists, information to present to a consumer of a given product (perhaps promotional), or other information. These information requests may be made before, during, or immediately after the product is dispensed 86.

The information stored in the manufacturing database 66 may be used to generate many types of reports 90. For example, one report 88 might indicate the current location of every product container. Another report 89 might indicate all dispensers with product containers whose expiration date has been reached. Reports may be compiled using any data element as a primary sort key, secondary sort key, tertiary sort key, etc. Also, hot reports may be generated of where invalid or improper (i.e., incorrectly branded) product has been improperly placed in a dispenser.

It is also preferable to generate reports of the flow of product containers through the manufacturing, warehousing, distribution, and dispensing system to determine bottlenecks, excess inventory, etc.

It is also preferable to generate reports of sales by product, by distributor, by warehouse, and to identify sales trends of individual dispensing machines in order to optimize sales and to optimize refill visits by the food service operator.

Thus, in accordance with the foregoing, the objects of the present invention are achieved. Of course, as is well known in the art, there are many methods which may be used to implement the present invention. Thus, while the preferred embodiments of the present invention are described, further changes and modifications can be made by those skilled in the art without departing from the true spirit of the invention, which includes all such changes and modifications that come within the scope of the claims set forth below.

What is claimed is:

1. A food package for delivering a beverage-forming product to a dispenser configured to prepare and dispense a beverage product from the beverage-forming product by diluting said beverage-forming product with a diluent in the dispenser comprising a single-serving or multi-serving receptacle having at least one wall member that defines an enclosure, a beverage-forming product present within the enclosure; wherein the beverage-forming product is configured for providing a beverage product when diluted with diluent in the dispenser, and a programmable tag associated with the beverage-forming product or single-serving or multi-serving receptacle, wherein the programmable tag includes machine-readable information regarding the product which information is programmed at the manufacturing plant and includes instructions or a verification code in electronic form for controlling at least one of preparation of a beverage from the beverage-forming product in the dispenser or dispensing of a beverage from the dispenser, wherein the programmable tag comprises preparation instructions or data relevant for configurating the dispenser as to the preparation of the beverage.

2. The food package of claim 1, wherein the tag is affixed to an exterior surface of the package.

3. The food package of claim 1, wherein the tag is an RFID device.

4. The food package of claim 1, wherein the tag is affixed to an interior surface of the package.

5. The food package of claim 1, wherein the tag includes a date of expiration in electronic form for the product.

6. The food package of claim 1, wherein the verification code is an expiration date determined from the date when the package is opened.

7. The food package of claim 1, wherein the food- or beverage-forming product is a powder, a concentrate or a ready-to-drink product.

8. A method of preparing or dispensing a beverage, which method comprises:
encoding instructions in electronic form on a machine-readable tag at a manufacturing plant for preparation of a single-serving or multi-serving of the beverage;
associating the tag with the single-serving or multi-serving of a beverage-forming product or a single-serving or multi-serving package that contains the product;
wherein the beverage-forming product is configured for providing a beverage product when diluted with diluent in the dispenser;
placing the package in or close to a dispenser configured to prepare and dispense a beverage product from the beverage-forming product by diluting said beverage-forming product with a diluent in the dispenser;
reading of the machine-readable tag by the dispenser prior to preparation or dispensing of the single-serving or multi-serving of the beverage; and
executing the electronic instructions encoded on the machine-readable tag by the dispenser to prepare or dispense the single-serving or multi-serving of the beverage;
wherein the preparation or dispense of the single-serving or multi-serving of the beverage includes a diluting step of the beverage-forming product with a diluent, wherein the encoded instructions are relevant for configurating the dispenser regarding any of the following parameters selected from the group consisting of diluent temperature, beverage temperature, diluent ratio, mixing or whipping time, mixing or whipping speed, dispensing time, measured amount of beverage-forming product and combinations thereof.

9. A method of controlling the preparation or dispensing of a beverage product from a beverage-forming product, which method comprises:
encoding a verification code in electronic form on a machine-readable tag at a manufacturing plant, wherein the tag is associated with a single-serving or multi-serving of a beverage-forming product or a single-serving or multi-serving food package that contains the product; wherein the beverage-forming product is configured for providing a beverage product when diluted with diluent in the dispenser;

placing the single-serving or multi-serving package in or close to a dispenser configured to prepare and dispense a beverage product from the beverage-forming product by diluting said beverage-forming product with a diluent in the dispenser;

reading of the machine-readable tag by the dispenser prior to preparation or dispensing of a beverage from the single-serving or multi-serving beverage-forming product; and comparing of the verification code read from the machine-readable tag with a list of valid verification codes;

wherein the beverage is either prepared from the single-serving or multi-serving beverage-forming product or dispensed when the verification code read from the machine-readable tag matches a valid verification code from the list; wherein the preparation or dispense of the single-serving or multi-serving of the beverage includes a diluting step of the beverage-forming product with a diluent; wherein the encoded instructions are relevant for configurating the dispenser regarding any of the following parameters selected from the group consisting of diluent temperature, beverage temperature, diluent ratio, mixing or whipping time, mixing or whipping speed, dispensing time, measured amount of beverage-forming product and combinations thereof.

10. The method of claim 9, wherein an error code is generated when the verification code read from the machine-readable tag does not match a valid verification code from the list.

11. The method of claim 10, wherein the error code disables the dispenser from preparing or dispensing the food or beverage.

12. The method of claim 10, wherein the error code notifies a consumer that the product selected for dispensing is not available.

13. The method of claim 10, wherein the error code notifies an operator of the dispenser that an invalid product verification code has been read.

14. A system for dispensing a product, comprising:
at least one single-serving or multi-serving food package including a receptacle having at least one wall member that defines an enclosure, and a beverage-forming product present within the enclosure; wherein the beverage-forming product is configured for providing a beverage product when diluted with diluent in the dispenser, a programmable tag associated with the beverage-forming product or at least one single-serving package; and a dispenser adapted for reading the programmable tag and for preparing and dispensing a beverage from the beverage-forming product(s) of the single-serving package(s); wherein the preparation or dispense of the single-serving or multi-serving of the beverage includes a diluting step of the beverage-forming product with a diluent;

wherein the programmable tag contains information that is relevant to the preparation of the beverage and to set the dispenser regarding any of the following parameters selected from the group consisting of diluent temperature, beverage temperature, diluent ratio, mixing or whipping time, mixing or whipping speed, dispensing time, measured amount of beverage-forming product and combinations thereof.

15. The system of claim 14, wherein the package is composed of a non-conductive material and the tag is located within the enclosure.

16. The system of claim 14, wherein the package is composed of a conductive material and the tag is attached to the at least one wall member on a side opposite that of the enclosure.

17. The system of claim 14, wherein the tag is an RFID device that includes information in electronic form regarding the features, properties or processing of the product.

18. The system of claim 14, wherein the dispenser includes a tag reader for reading the tag, and a processor having memory operatively associated with the dispenser, and the tag reader, and a connection to an external communications network, the processor configured to
signal the tag reader to read the tag;
receive information read from the tag by the tag reader;
store the information in the memory; and
place the information on the external communications network.

19. The system of claim 18, wherein the tag includes product preparation instructions in electronic form and the processor is also configured to carry out the instructions to prepare and dispense the product.

20. The system of claim 19, wherein the processor sets one of a dilution ratio, an operating temperature, a mixing time, or a dispensing time for the dispenser in accordance with the set of instructions in electronic form.

21. The system of claim 19, wherein the processor is further configured to read a current time and date from an electronic clock, and then the processor compares the current time and date with a time and date of expiration contained in the set of information; and when the current time and date is earlier than or equal to the time and date of expiration, processor disables the dispenser from dispensing the product.

22. The system of claim 21, further comprising the step of:
when the current time and date is earlier than or equal to the time and date of expiration, the processor places a data set on the external communications network, the data set to include a name of the product, the time and date of expiration, and an indicia of identification for the dispenser.

23. The system of claim 14, wherein the dispenser includes pre-determined quality indicia comprising at least one of a brand name, an indication of origin, a generic product grading or an expiration date.

24. The system of claim 23, which further comprises preparing the beverage from the beverage-forming products only when collected information from the programmable tag matches at least one of the pre-determined quality indicia.

25. The system of claim 23, which further comprises dispensing the prepared beverage only when collected information from the programmable tag matches at least one of the pre-determined quality indicia.

26. A single-serving or multi-serving food package for delivering a beverage-forming product to a dispenser configured to prepare and dispense a beverage product from the beverage-forming product by diluting said beverage-forming product with a diluent in the dispenser, comprising:
a receptacle having at least one wall member that defines an enclosure, the enclosure housing a single-serving or multi-serving of a beverage-forming product; wherein the beverage-forming product is configured for providing a beverage product when diluted with diluent in the dispenser;

a programmable tag associated with the beverage-forming product and single-serving package, wherein the programmable tag is electronically programmed at a manufacturing plant to include machine-readable information regarding the product, which information includes at least one of instructions or a verification code for controlling the dispenser to prepare the single-serving beverage from the beverage-forming product or to dispense the beverage, wherein the programmable tag contains coded information that is relevant to the preparation of the beverage for setting the dispenser regarding any of the following parameters selected from the group consisting of diluent temperature, beverage temperature, diluent ratio, mixing or whipping time, mixing or whipping speed, dispensing time, measured amount of beverage-forming product and combinations thereof.

27. The food package of claim 1, wherein the tag includes information in electronic form regarding at least one of features, properties and processing of the product.

28. The food package of claim 1, wherein the preparation instruction or data are relevant for configurating the dispenser regarding any of the parameters selected from the group consisting of diluent temperature, beverage temperature, diluent ratio, mixing or whipping time, mixing or whipping speed, dispensing time, measured amount of beverage-forming product and combinations thereof.

* * * * *